Patented Sept. 18, 1923.

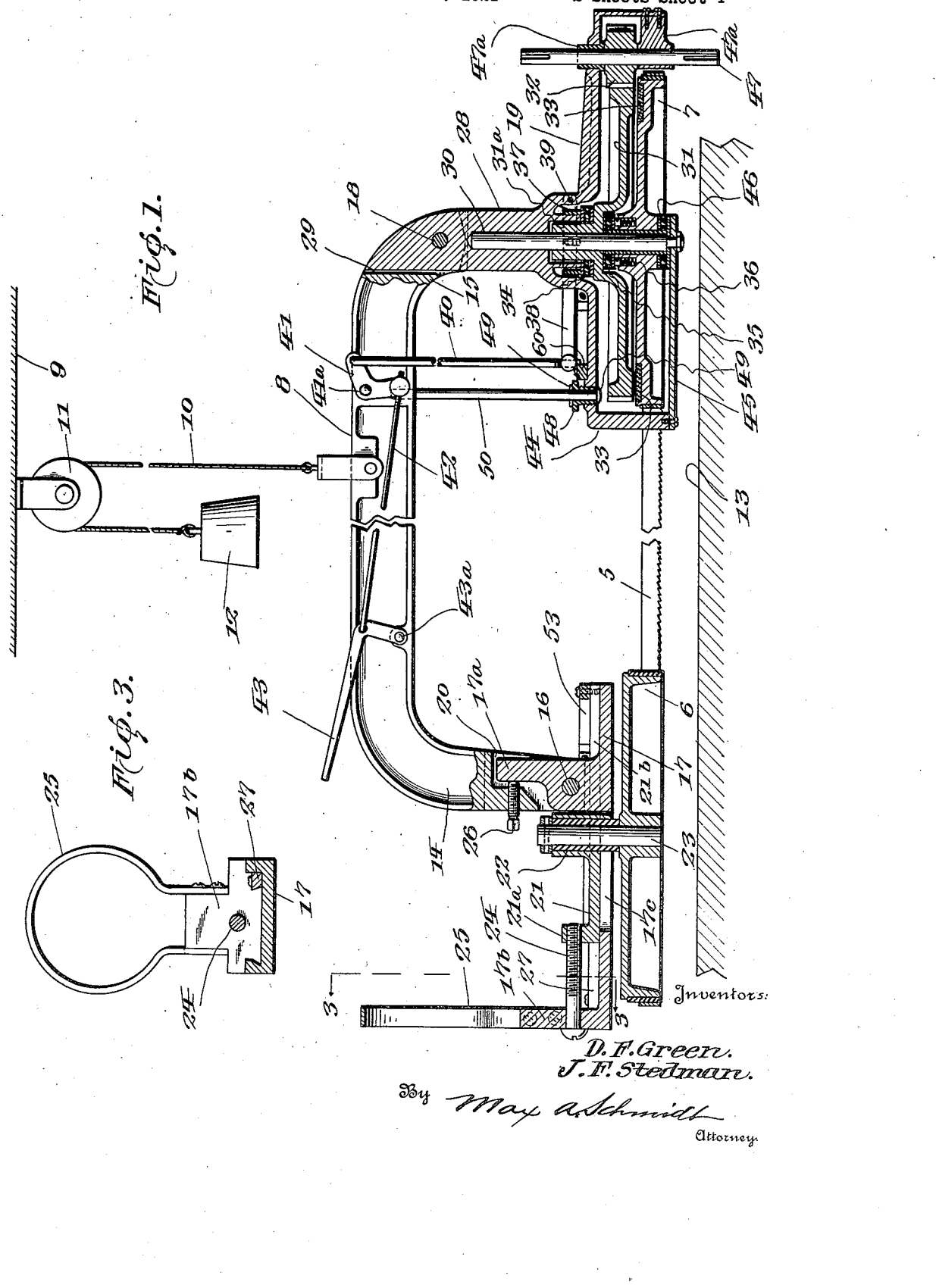

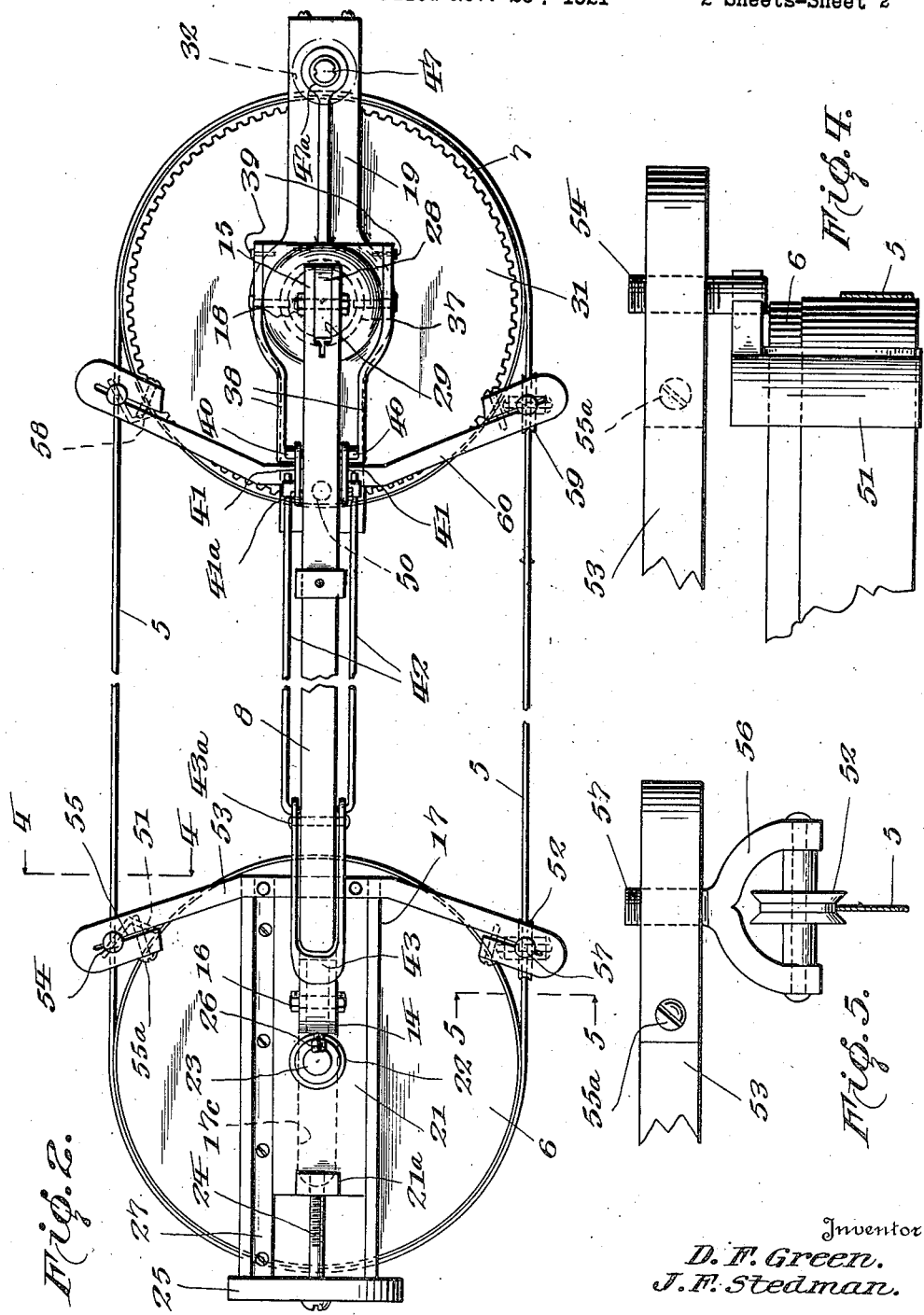

1,468,381

UNITED STATES PATENT OFFICE.

DANIEL F. GREEN, OF PORTLAND, AND JOHN F. STEDMAN, OF TIGARD, OREGON; SAID GREEN ASSIGNOR TO SAID STEDMAN.

BAND SAW.

Application filed November 26, 1921. Serial No. 517,933.

*To all whom it may concern:*

Be it known that we, DANIEL F. GREEN and JOHN F. STEDMAN, citizens of the United States, residing at Portland, county of Multnomah, State of Oregon, and Tigard, in the county of Washington and State of Oregon, have invented certain new and useful Improvements in Band Saws, of which the following is a specification.

The band-saw which is the subject matter of the present application for patent has been designed more particularly for use by butchers to saw bones, although it is not limited to such use but may be employed for any other work requiring a band-saw.

The invention has for its object to provide a band-saw embodying certain novel and improved structural details and modes of operation as will be described in detail hereinafter, and in order that the same may be better understood, reference is had to the accompanying drawings forming a part of this specification.

In the drawings,

Figure 1 is an elevation of the machine, partly in section; Fig. 2 is a plan view; Fig. 3 is a cross section on the line 3—3 of Fig. 1, and Figs. 4 and 5 are enlarged sectional details on the lines 4—4 and 5—5, respectively, of Fig. 2.

Referring specifically to the drawings, 5 denotes a band-saw passing around band-wheels 6 and 7, the former being an idler and the latter the driving wheel, power being applied thereto in a manner to be presently described. The drawings show the saw arranged to travel in a horizontal plane to make a vertical cut downwardly but it may also be arranged to travel in a vertical plane. If the saw is to be used for sawing bones, it will usually be portable, but this is immaterial, and if desired a permanent support may be provided.

The main supporting frame of the saw is a beam 8 which may be hung from a ceiling or other overhead support 9 by a cable, cord, chain, or the like 10 fastened at one end to the beam and passing over a pulley 11 carried by the overhead support, with a counterbalancing weight 12 on the other end of the cable. The saw is hung above a block 13 or other support for the meat.

The beam 8 has laterally extending end portions 14 and 15, which, in the present instance, are downturned. To the end portion 14 is pivoted, as shown at 16, a support 17 for the band-wheel 6, and to the end portion 15 is pivoted, as shown at 18, a support 19 for the band-wheel 7. The pivots of the two band-wheel supports are horizontal.

The band-wheel support 17 is a plate having an upstanding lug 17$^a$ on its back which extends into a slot 20 in the part 14 to receive the pivot 16. On the back of the plate 17 is slidably mounted a plate 21 having a bearing 22 for the shaft 23 of the band-wheel 6, said bearing being thus made adjustable for the purpose of moving the band-wheel to regulate the tension of the saw 5. The adjustment is made by a screw 24 threaded into an end lug 21$^a$ of plate 21, and carried by an end flange 17$^b$ of plate 17, to which latter flange is also attached a looped arm-rest 25. The plate 17 may also be tilted about its pivot 16 to line up the saw 5, this being done by a set screw 26 threaded through the part 14 to engage the lug 17$^a$. The plate 17 has a longitudinal slot 17$^c$ through which the band wheel-shaft 23 passes, and the plate 21 has a slot 21$^b$ through which the lug 17$^a$ passes.

The plate 17 has a top groove in which the plate 21 slidably seats, one side of the groove being undercut, and its other side being fitted with a retaining strip 27 to prevent upward displacement of the plate 21.

The band-wheel support 19 is a plate having an upstanding post 28 on its back which has its upper end reduced and seating in an aperture 29 in the part 15 to receive the pivot 18. The post 28 carries a depending vertical shaft 30 which supports the band-wheel 7 and a spur-gear 31 above the latter. A drive-pinion 32 is in mesh with the gear 31, and the side of the latter which faces the wheel 7 is adapted to frictionally engage said wheel to impart motion thereto for driving the saw 5. The side of the wheel 7 has a facing 33 of leather or other friction material.

The hub of the gear 31 is engageable by a ball-bearing thrust plate 34, said hub having a reduced extension 31$^a$ on which the thrust plate seats, the latter being annular. Between the hub of gear 31 and the hub of wheel 7 is a ball bearing thrust plate 35 for forcing the gear away from said wheel to break the driving connection, said thrust plate being operated by springs 36 seating in recesses in the wheel hub and bearing on the thrust plate.

The thrust plate 34 is operated to jam the gear 31 into frictional and driving engagement with the wheel 7 by a shifter ring 37 carried by a pair of laterally spaced levers 38 straddling the post 28 and pivoted thereto at one of their ends, as shown at 39. The other ends of the levers 38 are connected by adjustable rods 40 to bell-crank levers 41 fulcrumed at 41ᵃ to the beam 8, and connected by adjustable rods 42 to a control lever 43 also fulcrumed on said beam, as shown at 43ᵃ. The lever 43 is adjacent to the loop 25.

In operation the meat is sliced to the bone in the usual way, after which the operator slips his right hand through the loop 25, and with his thumb presses on the control lever 43, whereby, through the connections of said lever with the ring 37, the latter is moved downwardly to press the thrust plate 34 against gear 31 and thereby jam the latter into frictional and driving engagement with the wheel 7, whereupon the saw 5 is set in motion to cut through the bone. To stop the saw, it is necessary only to release the lever 43, whereupon the springs 36, through thrust plate 35, back the gear 31 away from wheel 7 to break the driving connection. The gear 31 is of course loose on shaft 30 so that it may be slid toward and from the wheel 7 as described.

The plate 19 has a depending end flange 44 carrying a support 45 for the lower end of shaft 30, with a ball bearing 46 between said support and the hub of the wheel 7.

The drive pinion 32 is on a shaft 47 supported in bearings 47ᵃ carried by the plate 19. This shaft may have either of its ends connected by a flexible shaft or other means to an electric motor or other power source.

The plate 19 is pivotally supported so that it may be tilted for the same reason as the plate 17. This is done by a bushing 48 threaded into the plate 19 and having its ends in contact with stationary abutments 49 on a rod 50 which extends at one end into the bushing, and is supported at its other end by the beam 8.

The wheel 6 is also provided with a scraper to keep its periphery clear of bone dust, and the saw 5 is here provided with a guide to keep it in contact with the bone being operated on. The scraper is a blade 51, and the guide is a grooved wheel 52 engaging the back edge of the saw. These two devices are carried by a cross-arm 53 supported by and extending from opposite sides of the plate 21. The scraper blade 51 is carried by a screw shank 54 which is threaded into one end of the arm 53 to permit adjustment. Where the shank 54 is screwed into the arm 53, the latter is split, as shown at 55, and by means of a screw 55ᵃ this split portion may be drawn together to firmly grip the shank and lock the same to maintain the adjusted position of the scraper blade. The guide wheel 52 is carried by a fork 56 having a screw shank 57 which is secured to the other end of the arm in the same manner as the screw shank 54.

A scraper 58 is also provided for the wheel 7, and this end of the saw also has a guide wheel 59. These parts are arranged and supported in the same manner as the scraper 51 and the guide wheel 52, they being carried at the ends of a cross-arm 60 supported by the plate 19.

As the saw 5 cuts one way only it throws the bone dust ahead and keeps the meat clean. The saw also does not pull loose pieces back and hence it does not jump to cut the operator's fingers, which very often happens with a reciprocating hand saw. The saw is also readily controlled and it can be instantly started and stopped at will.

We claim:

1. A band saw machine comprising an inverted U-shaped frame having downwardly extending legs, a band wheel support pivoted on one of the legs of said frame, a band wheel carried by said support, a tilting member pivoted to the remaining leg of the frame and having an upstanding lug projecting above the pivot of said member, an adjusting screw passing through the frame and engaging said lug, a slide on said tilting member provided with a bearing at one end and an upstanding lug at the other, guides on the tilting member for guiding said slide in movement toward and from the first mentioned band wheel support, an arm projecting upward from the outer end of the tilting member, an adjusting screw passing through said arm and screwed into the lug on the slide whereby to move the slide in its guides, a shaft mounted in said bearing, a band wheel mounted on said shaft, and an arm band extending upward from the rear end of the tilting member whereby the hand may be slid through the arm band to grasp the frame and manipulate the same.

2. A band saw machine comprising an inverted U-shaped frame having downwardly extending legs, a band wheel support pivoted on one of the legs of said frame, a band wheel carried by said support, a tilting member pivoted to the remaining leg of the frame and having an upstanding lug projecting above the pivot of said member, an adjusting screw passing through the frame and engaging said lug, a slide on said tilting member provided with a bearing at one end and an upstanding lug at the other, guides on the tilting member for guiding said slide in movement toward and from the first mentioned band wheel support, an arm projecting upward from the outer end of the tilting member, an adjusting screw passing through said arm and screwed into the lug on the slide whereby to move the slide in its guides, a shaft mounted in said bearing, a band wheel mounted on said shaft, an arm band extending upward from the rear end of the tilting member whereby the hand may be slid through the arm band to grasp the frame and manipulate the same; in combination with means for supporting the frame for free movement from overhead including a pulley, a counterbalance weight, and a flexible connection between said counterbalance weight and the frame extending over said pulley.

In testimony whereof we affix our signatures.

DANIEL F. GREEN.
JOHN F. STEDMAN.